R. F. Brown,
Rotary Steam Valve.
N° 65,336. Patented June 4, 1867.
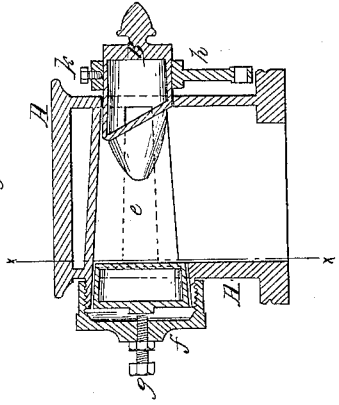
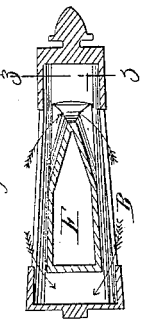
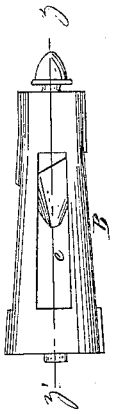
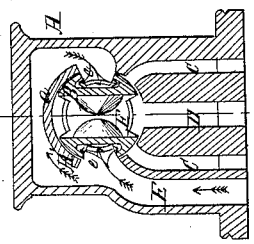
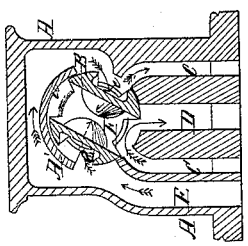
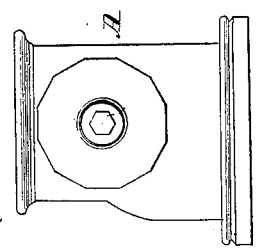
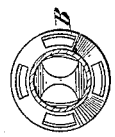
Witnesses
Theo Tusche
Wm Truurn
Inventor.
R F Brown
Per Munn
Attorneys

United States Patent Office.

R. F. BROWN, OF SAVANNAH, GEORGIA.

Letters Patent No. 65,336, dated June 4, 1867.

---

IMPROVEMENT IN STEAM ROTARY VALVES.

---

*The Schedule referred to in these Letters Patent and making part of the same.*

---

TO ALL WHOM IT MAY CONCERN:

Be it known that I, R. F. BROWN, of Savannah, in the county of Chatham, and State of Georgia, have invented a new and useful Improvement in Equilibrium Steam-Valve; and I do hereby declare that the following is a full, clear, and exact description thereof, which will enable others skilled in the art to make and use the same, reference being had to the accompanying drawings, forming part of this specification.

This invention relates to the arrangement of the ways of the oscillating steam-valve and its seat, and the peculiar manner in which an equilibrium of pressure upon the valve is obtained; and the invention consists in the arrangement of the valve, with apertures for the admission and exhaust of the steam, in such a manner that the steam presses equally, or nearly so, upon each side of the valve, as will be hereinafter described.

Figure 1 represents a view of the steam-chest with the valve in place.

Figure 2 shows a cross-section of fig. 3 through the line $x\ x$, showing the valve-seat and the steam-ports closed.

Figure 3 is a longitudinal section through the line $y\ y$ of fig. 2.

Figure 4 is a cross-section through the line $z\ z$ of fig. 6.

Figure 5 is the same as fig. 2, showing valve-seat and the steam-ports open.

Figure 6 is a longitudinal section of the valve detached, it being through the line $z'\ z'$ of fig. 7.

Figure 7 is a side view of the valve, showing one of the steam apertures on the sides of the valve.

Similar letters of reference indicate like parts.

A represents the valve-chest. A' is the valve-seat. B is the valve. C represents the steam-ports leading to the cylinder. D is the exhaust-port. E is the aperture by which the steam enters the chest. The valve B itself is a mere skeleton. The apparatus and recesses are connected together in such a manner that the steam presses equally upon it when it stands as seen in fig. 2, and at all times, and when exhausting, as seen in fig. 5, the exhausting steam reacts against the shell or seat at $a$. The steam passes into the chest through the aperture E, and around the upper portion of the seat $a$, and through the head of the valve to the other side, when the cylinder takes steam through the right-hand port, as seen in fig. 5. The steam exhausts into a slot, F, which passes entirely through the valve, and which extends nearly its whole interior length. This aperture through the valve is seen in fig. 6. The apertures through which the cylinder takes steam are seen in figs. 2 and 5, marked $e$, and in shaded lines in figs. 6 and 7. These apertures pass round both ends of the exhaust-opening, both ends of the valve being hollow, with solid or entire ends, as shown in fig. 6. The base of these side apertures is enlarged, as seen, which allows freer ingress and egress of the steam. Longitudinally the exhaust-opening of the valve is entirely surrounded by steam, and on its sides the pressure is always balanced. This valve is operated by a lever which receives its motion from a rock-shaft or eccentric, or from any other part of the machinery, and it is made to oscillate in its seat, by which motion it opens and closes the ports of the cylinder. $f$, fig. 3, represents a cap on the large end of the valve. Through this cap there is a set-screw, $g$, the inner end of which is made to operate on the valve, keeping it thereby sufficiently tight in its seat. $h$ is an arm on the other end of the valve by which the valve is oscillated. This arm is fastened by a set-screw, $k$. The course of the steam through the valve and the ports is indicated by arrows, and the operation of the valve will be readily understood by those acquainted with the subject. The seat of the valve A' is plainly shown in section in figs. 2 and 5. It will be seen that the steam passes entirely round its upper portion, while the valve is relieved of the usual friction against it by the pressure in opposite directions.

Having thus described my invention, what I claim as new, and desire to secure by Letters Patent, is—

The arrangement of the induction passage E, eduction passage D, with reference to the passages C C and the valve B, substantially upon the principle and in the manner as herein set forth.

R. F. BROWN.

Witnesses:
WM. F. MOORE,
CHARS. COLLINS.